(12) United States Patent
Werner

(10) Patent No.: US 9,427,902 B2
(45) Date of Patent: Aug. 30, 2016

(54) CAVITY FILLING

(75) Inventor: Dietmar Werner, Woerth (DE)

(73) Assignee: Zephyros, Inc., Romeo, MI (US)

( * ) Notice: Subject to any disclaimer, the term of this patent is extended or adjusted under 35 U.S.C. 154(b) by 1078 days.

(21) Appl. No.: 13/395,583

(22) PCT Filed: Sep. 14, 2010

(86) PCT No.: PCT/EP2010/005614
§ 371 (c)(1),
(2), (4) Date: May 31, 2012

(87) PCT Pub. No.: WO2011/032677
PCT Pub. Date: Mar. 24, 2011

(65) Prior Publication Data
US 2012/0237732 A1    Sep. 20, 2012

(30) Foreign Application Priority Data
Sep. 15, 2009    (GB) .................................. 0916205.8

(51) Int. Cl.
| C08J 9/10 | (2006.01) |
| B29C 44/18 | (2006.01) |
| B62D 29/00 | (2006.01) |

(52) U.S. Cl.
CPC .............. *B29C 44/18* (2013.01); *B62D 29/002* (2013.01); *Y10T 428/24504* (2015.01); *Y10T 428/249987* (2015.04)

(58) Field of Classification Search
CPC ............................. B62D 25/04; B62D 29/002
USPC ........................ 296/191, 203.01, 203.03, 188
See application file for complete search history.

(56) References Cited

U.S. PATENT DOCUMENTS

| 625,559 A | 5/1899 | Keeler |
| 3,860,541 A | 1/1975 | Lehmann et al. |
| 3,944,631 A | 3/1976 | Yu et al. |
| 3,984,497 A | 10/1976 | Owens et al. |
| 3,985,703 A | 10/1976 | Ferry et al. |
| 4,034,013 A | 7/1977 | Lane |
| 4,096,202 A | 6/1978 | Farnham et al. |
| 4,138,462 A | 2/1979 | Procida et al. |
| 4,304,709 A | 12/1981 | Salee |

(Continued)

FOREIGN PATENT DOCUMENTS

| CA | 2425414 A1 | 4/2002 |
| CN | 1646288 | 7/2005 |

(Continued)

OTHER PUBLICATIONS

Chinese Office Action dated Jun. 8, 2015; Application No. 201080050798.0.

(Continued)

*Primary Examiner* — Ellen S Wood
(74) *Attorney, Agent, or Firm* — The Dobrusin Law Firm, PC

(57) ABSTRACT

A laminar structure (1) for providing foam within cavities such as those in automobile pillars and rails is provided comprising a metal foil (4) having a central section (2) and two end sections (3, 4), the central section carrying a foamable material (5) and the end sections being securable to the flanges (8, 9, 15, 16) of the cavity forming members (7, 14). The cavity containing the foam after foaming is also provided.

20 Claims, 4 Drawing Sheets

(56) References Cited

U.S. PATENT DOCUMENTS

| | | |
|---|---|---|
| 4,306,040 A | 12/1981 | Baer |
| 4,427,481 A | 1/1984 | Smith et al. |
| 4,495,324 A | 1/1985 | Chacko et al. |
| 4,536,436 A | 8/1985 | Maeko et al. |
| 4,538,380 A | 9/1985 | Colliander |
| 4,601,769 A | 7/1986 | DeHoff |
| 4,693,775 A | 9/1987 | Harrison et al. |
| 4,724,243 A | 2/1988 | Harrison et al. |
| 4,749,434 A | 6/1988 | Harrison |
| 4,769,166 A | 9/1988 | Harrison |
| 4,778,845 A | 10/1988 | Tschan et al. |
| 4,833,191 A | 5/1989 | Bushway et al. |
| 4,871,590 A | 10/1989 | Merz et al. |
| 4,898,630 A | 2/1990 | Kitoh et al. |
| 4,908,273 A | 3/1990 | Urech et al. |
| 4,922,596 A | 5/1990 | Wycech |
| 4,923,902 A | 5/1990 | Wycech |
| 4,978,562 A | 12/1990 | Wycech |
| 4,995,545 A | 2/1991 | Wycech |
| 5,074,913 A | 12/1991 | Trivett |
| 5,124,186 A | 6/1992 | Wycech |
| 5,164,472 A | 11/1992 | White et al. |
| 5,266,133 A * | 11/1993 | Hanley ............... B60R 13/08 156/308.4 |
| 5,274,006 A | 12/1993 | Kagoshima et al. |
| 5,275,853 A | 1/1994 | Silvis et al. |
| 5,342,873 A | 8/1994 | Merz et al. |
| 5,344,208 A | 9/1994 | Bien et al. |
| 5,382,606 A | 1/1995 | Butikofer |
| 5,401,814 A | 3/1995 | Schomaker et al. |
| 5,464,924 A | 11/1995 | Silvis et al. |
| 5,464,942 A | 11/1995 | Sakurai et al. |
| 5,470,886 A | 11/1995 | Makhlouf et al. |
| 5,475,039 A | 12/1995 | Butikofer |
| 5,506,025 A | 4/1996 | Otto et al. |
| 5,575,526 A | 11/1996 | Wycech |
| 5,631,304 A | 5/1997 | Hasegawa |
| 5,648,401 A | 7/1997 | Czaplicki et al. |
| 5,649,400 A | 7/1997 | Miwa |
| 5,708,042 A | 1/1998 | Hasegawa |
| 5,712,317 A | 1/1998 | Makhlouf et al. |
| 5,725,272 A | 3/1998 | Jones |
| 5,755,486 A | 5/1998 | Wycech |
| 5,766,719 A | 6/1998 | Rimkus |
| 5,783,272 A | 7/1998 | Wong |
| 5,834,078 A | 11/1998 | Cavitt et al. |
| 5,884,960 A | 3/1999 | Wycech |
| 5,894,071 A | 4/1999 | Merz et al. |
| 5,911,932 A | 6/1999 | Dyksterhouse |
| 5,931,474 A | 8/1999 | Chang et al. |
| 5,932,680 A | 8/1999 | Heider |
| 5,948,508 A | 9/1999 | Pastore et al. |
| 5,962,093 A | 10/1999 | White et al. |
| 5,964,979 A | 10/1999 | George et al. |
| 5,979,902 A | 11/1999 | Chang et al. |
| 5,985,435 A | 11/1999 | Czaplicki et al. |
| 5,994,422 A | 11/1999 | Born et al. |
| 5,997,077 A | 12/1999 | Siebels et al. |
| 6,003,274 A | 12/1999 | Wycech |
| 6,004,425 A | 12/1999 | Born et al. |
| 6,006,484 A | 12/1999 | Geissbuhler |
| 6,030,701 A | 2/2000 | Johnson et al. |
| 6,033,300 A | 3/2000 | Schneider |
| 6,040,350 A | 3/2000 | Fukui |
| 6,057,382 A | 5/2000 | Karim et al. |
| 6,068,922 A | 5/2000 | Vercesi et al. |
| 6,077,884 A | 6/2000 | Hess et al. |
| 6,093,358 A | 7/2000 | Schiewe et al. |
| 6,096,791 A | 8/2000 | Born et al. |
| 6,103,341 A | 8/2000 | Barz et al. |
| 6,103,784 A | 8/2000 | Hilborn et al. |
| 6,111,015 A | 8/2000 | Eldin et al. |
| 6,131,897 A | 10/2000 | Barz et al. |
| 6,133,335 A | 10/2000 | Mahoney et al. |
| 6,135,541 A | 10/2000 | Geise et al. |
| 6,136,398 A | 10/2000 | Willett et al. |
| 6,136,944 A | 10/2000 | Stewart et al. |
| 6,146,565 A | 11/2000 | Keller |
| 6,150,428 A | 11/2000 | Hanley et al. |
| 6,153,302 A | 11/2000 | Karim et al. |
| 6,162,504 A | 12/2000 | Hubert et al. |
| 6,174,932 B1 | 1/2001 | Pachl et al. |
| 6,180,715 B1 | 1/2001 | Schmidt |
| 6,218,442 B1 | 4/2001 | Hilborn et al. |
| 6,228,449 B1 | 5/2001 | Meyer |
| 6,232,433 B1 | 5/2001 | Narayan |
| 6,235,842 B1 | 5/2001 | Kuwano et al. |
| 6,263,635 B1 | 7/2001 | Czaplicki |
| 6,270,600 B1 | 8/2001 | Wycech |
| 6,277,898 B1 | 8/2001 | Pachl et al. |
| 6,281,260 B1 | 8/2001 | Hanley et al. |
| 6,287,666 B1 | 9/2001 | Wycech |
| 6,287,669 B1 | 9/2001 | George et al. |
| 6,296,298 B1 | 10/2001 | Barz |
| 6,303,672 B1 | 10/2001 | Papalos et al. |
| 6,311,452 B1 | 11/2001 | Barz et al. |
| 6,312,668 B2 | 11/2001 | Mitra et al. |
| 6,319,964 B1 | 11/2001 | Blank et al. |
| 6,348,513 B1 | 2/2002 | Hilborn et al. |
| 6,350,791 B1 | 2/2002 | Feichtmeier et al. |
| 6,358,584 B1 | 3/2002 | Czaplicki |
| 6,368,438 B1 | 4/2002 | Chang et al. |
| 6,376,564 B1 | 4/2002 | Harrison |
| 6,382,635 B1 | 5/2002 | Fitzgerald |
| 6,383,610 B1 | 5/2002 | Barz et al. |
| 6,403,222 B1 | 6/2002 | Harrison |
| 6,413,611 B1 | 7/2002 | Roberts et al. |
| 6,419,305 B1 | 7/2002 | Larsen |
| 6,429,244 B1 | 8/2002 | Rinka et al. |
| 6,432,475 B1 | 8/2002 | Yamamoto et al. |
| 6,437,055 B1 | 8/2002 | Moriarity et al. |
| 6,440,257 B1 | 8/2002 | Zhou et al. |
| 6,441,075 B2 | 8/2002 | Hirata et al. |
| 6,441,081 B1 | 8/2002 | Sadatoshi et al. |
| H2047 H | 9/2002 | Harrison et al. |
| 6,444,149 B1 | 9/2002 | Valentinsson |
| 6,444,713 B1 | 9/2002 | Pachl et al. |
| 6,448,338 B1 | 9/2002 | Born et al. |
| 6,451,231 B1 | 9/2002 | Harrison et al. |
| 6,451,876 B1 | 9/2002 | Koshy |
| 6,455,146 B1 | 9/2002 | Fitzgerald |
| 6,455,476 B1 | 9/2002 | Imai et al. |
| 6,455,634 B1 | 9/2002 | Khandpur et al. |
| 6,467,834 B1 | 10/2002 | Barz et al. |
| 6,471,285 B1 | 10/2002 | Czaplicki et al. |
| 6,474,726 B1 | 11/2002 | Hanakawa et al. |
| 6,479,560 B2 | 11/2002 | Freitag et al. |
| 6,482,486 B1 | 11/2002 | Czaplicki et al. |
| 6,486,256 B1 | 11/2002 | Tarbutton et al. |
| 6,489,400 B2 | 12/2002 | Khandpur et al. |
| 6,506,494 B2 | 1/2003 | Brandys et al. |
| 6,546,693 B2 | 4/2003 | Wycech |
| 6,548,593 B2 | 4/2003 | Merz et al. |
| 6,561,571 B1 | 5/2003 | Brennecke |
| 6,573,309 B1 | 6/2003 | Reitenbach et al. |
| 6,586,089 B2 | 7/2003 | Golden |
| 6,589,621 B1 | 7/2003 | Beckerdite et al. |
| 6,593,380 B2 | 7/2003 | Gehlsen et al. |
| 6,607,831 B2 | 8/2003 | Ho et al. |
| 6,617,366 B2 | 9/2003 | Sueda et al. |
| 6,620,501 B1 | 9/2003 | Kassa et al. |
| 6,634,698 B2 | 10/2003 | Kleino |
| 6,668,457 B1 | 12/2003 | Czaplicki |
| 6,682,818 B2 | 1/2004 | Czaplicki et al. |
| 6,692,347 B1 | 2/2004 | Schneider |
| 6,706,772 B2 | 3/2004 | Czaplicki et al. |
| 6,706,802 B2 | 3/2004 | Carlson et al. |
| 6,722,720 B2 | 4/2004 | Donick et al. |
| 6,730,713 B2 | 5/2004 | Czaplicki |
| 6,740,067 B2 | 5/2004 | Leise et al. |
| 6,740,379 B1 | 5/2004 | Congard et al. |
| 6,740,399 B1 | 5/2004 | George et al. |
| 6,753,379 B1 | 6/2004 | Kawate et al. |
| 6,774,171 B2 | 8/2004 | Kassa et al. |

(56) References Cited

U.S. PATENT DOCUMENTS

| | | |
|---|---|---|
| 6,776,869 B1 | 8/2004 | Schenkel |
| 6,777,079 B2 | 8/2004 | Zhou et al. |
| 6,787,065 B1 | 9/2004 | Schapira et al. |
| 6,787,579 B2 | 9/2004 | Czaplicki et al. |
| 6,787,593 B2 | 9/2004 | Bell et al. |
| 6,787,605 B2 | 9/2004 | Clough et al. |
| 6,787,606 B1 | 9/2004 | Chen |
| 6,790,597 B2 | 9/2004 | Dershem et al. |
| 6,790,906 B2 | 9/2004 | Chaignon et al. |
| 6,797,371 B1 | 9/2004 | Gehlsen et al. |
| 6,800,157 B2 | 10/2004 | Tarbutton et al. |
| 6,800,680 B2 | 10/2004 | Stark et al. |
| 6,805,768 B2 | 10/2004 | Agarwal et al. |
| 6,806,320 B2 | 10/2004 | Everaerts et al. |
| 6,811,864 B2 | 11/2004 | Czaplicki et al. |
| 6,820,923 B1 | 11/2004 | Bock |
| 6,824,451 B2 | 11/2004 | Hollatz et al. |
| 6,838,509 B2 | 1/2005 | Shimo et al. |
| 6,846,559 B2 | 1/2005 | Czalicki et al. |
| 6,884,854 B2 | 4/2005 | Schoenfeld et al. |
| 6,887,914 B2 | 5/2005 | Czalicki et al. |
| 6,890,964 B2 | 5/2005 | Czaplicki et al. |
| 6,894,082 B2 | 5/2005 | Brantl et al. |
| 6,911,109 B2 | 6/2005 | Giroux et al. |
| 6,920,693 B2 | 7/2005 | Hankins et al. |
| 6,955,593 B2 | 10/2005 | Lewis et al. |
| 6,991,237 B2 | 1/2006 | Kassa et al. |
| 7,008,680 B2 | 3/2006 | Everaerts et al. |
| 7,071,263 B2 | 7/2006 | Cheng et al. |
| 7,084,209 B2 | 8/2006 | Everaerts et al. |
| 7,084,210 B2 | 8/2006 | Eagle |
| 7,094,843 B2 | 8/2006 | Meyer |
| 7,119,149 B2 | 10/2006 | Ferguson et al. |
| 7,125,461 B2 | 10/2006 | Czaplicki et al. |
| 7,169,467 B2 | 1/2007 | Wilson |
| 7,199,165 B2 | 4/2007 | Kassa et al. |
| 7,297,740 B2 | 11/2007 | Dyksterhouse |
| 7,392,929 B1 | 7/2008 | Finerman et al. |
| 7,892,396 B2 | 2/2011 | Sheasley |
| 2002/0013389 A1 | 1/2002 | Taylor et al. |
| 2002/0123575 A1 | 9/2002 | Kato et al. |
| 2002/0164450 A1 | 11/2002 | Lupini et al. |
| 2002/0192387 A1 | 12/2002 | Agarwal et al. |
| 2003/0045620 A1 | 3/2003 | Carlson et al. |
| 2003/0050352 A1 | 3/2003 | Guenther et al. |
| 2003/0062739 A1 | 4/2003 | Bock |
| 2003/0183317 A1 | 10/2003 | Czaplicki et al. |
| 2003/0186049 A1 | 10/2003 | Czaplicki et al. |
| 2004/0011282 A1 | 1/2004 | Myers et al. |
| 2004/0048078 A1 | 3/2004 | Czaplicki et al. |
| 2004/0056472 A1 | 3/2004 | Schneider |
| 2004/0079478 A1 | 4/2004 | Merz |
| 2004/0180193 A1 | 9/2004 | Oda et al. |
| 2004/0181013 A1 | 9/2004 | Schenkel |
| 2004/0197545 A1 | 10/2004 | Gehlsen et al. |
| 2004/0204551 A1 | 10/2004 | Czaplicki et al. |
| 2004/0229000 A1 | 11/2004 | Khandpur et al. |
| 2004/0266898 A1 | 12/2004 | Kassa et al. |
| 2005/0016677 A1 | 1/2005 | Carlson et al. |
| 2005/0020703 A1 | 1/2005 | Czaplicki et al. |
| 2005/0081383 A1 | 4/2005 | Kosal et al. |
| 2005/0082111 A1 | 4/2005 | Weber |
| 2005/0103422 A1 | 5/2005 | Kawaguchi |
| 2005/0119372 A1 | 6/2005 | Czaplicki et al. |
| 2005/0154089 A1 | 7/2005 | Taylor et al. |
| 2005/0159511 A1 | 7/2005 | Kramer |
| 2005/0159531 A1 | 7/2005 | Ferng et al. |
| 2005/0172486 A1 | 8/2005 | Carlson et al. |
| 2005/0221046 A1 | 10/2005 | Finerman et al. |
| 2005/0230027 A1 | 10/2005 | Kassa et al. |
| 2005/0230165 A1 | 10/2005 | Thomas et al. |
| 2005/0241756 A1 | 11/2005 | Harthcock et al. |
| 2005/0249936 A1 | 11/2005 | Ui et al. |
| 2005/0279567 A1 | 12/2005 | Ito |
| 2006/0019595 A1 | 1/2006 | Lewis et al. |
| 2006/0057333 A1 | 3/2006 | Brahim |
| 2006/0065483 A1 | 3/2006 | Thomas |
| 2006/0124386 A1 | 6/2006 | Helferty |
| 2006/0155045 A1 | 7/2006 | Tsuno et al. |
| 2006/0188726 A1 | 8/2006 | Muenz et al. |
| 2006/0252860 A1 | 11/2006 | Ui et al. |
| 2007/0088138 A1 | 4/2007 | Czaplicki et al. |
| 2007/0090560 A1 | 4/2007 | Kassa et al. |
| 2007/0095475 A1 | 5/2007 | Hable |
| 2007/0101679 A1 | 5/2007 | Harthcock et al. |
| 2007/0116961 A1 | 5/2007 | Connell et al. |
| 2007/0117874 A1 | 5/2007 | Kassa et al. |
| 2007/0138683 A1 | 6/2007 | Kanie et al. |
| 2007/0264438 A1 | 11/2007 | Kawai |
| 2007/0284036 A1 | 12/2007 | Sheasley |
| 2008/0029200 A1 | 2/2008 | Sheasley |
| 2008/0060742 A1 | 3/2008 | Sheasley et al. |
| 2008/0311405 A1 | 12/2008 | Wang et al. |
| 2009/0269547 A1 | 10/2009 | Meyer et al. |
| 2010/0025147 A1 | 2/2010 | Kassa |
| 2012/0186721 A1 | 7/2012 | Preghenella |

FOREIGN PATENT DOCUMENTS

| | | |
|---|---|---|
| DE | 3838655 A1 | 5/1990 |
| DE | 19919783 A1 | 11/2000 |
| EP | 0360214 A2 | 3/1990 |
| EP | 0383498 A2 | 8/1990 |
| EP | 0442178 A1 | 8/1991 |
| EP | 0710696 A2 | 5/1996 |
| EP | 0730999 A1 | 9/1996 |
| EP | 0819723 A1 | 1/1998 |
| EP | 0893332 A1 | 1/1999 |
| EP | 1022320 A1 | 7/2000 |
| EP | 1055699 A1 | 11/2000 |
| EP | 1072647 A2 | 1/2001 |
| EP | 1122152 A2 | 8/2001 |
| EP | 1123348 A2 | 8/2001 |
| EP | 1149679 A2 | 10/2001 |
| EP | 1031496 B1 | 12/2001 |
| EP | 1182087 A2 | 2/2002 |
| EP | 0703931 B1 | 10/2003 |
| EP | 1362683 A2 | 11/2003 |
| EP | 1240266 B1 | 2/2004 |
| EP | 0851894 B1 | 4/2004 |
| EP | 1272587 B1 | 5/2004 |
| EP | 1155084 B1 | 6/2004 |
| EP | 1431325 A1 | 6/2004 |
| EP | 1075498 B1 | 7/2004 |
| EP | 0820491 B1 | 8/2004 |
| EP | 0947529 B1 | 8/2004 |
| EP | 1185595 A2 | 8/2004 |
| EP | 1252217 B1 | 8/2004 |
| EP | 1449868 A1 | 8/2004 |
| EP | 1023413 B1 | 9/2004 |
| EP | 1155082 B1 | 9/2004 |
| EP | 1305376 B1 | 9/2004 |
| EP | 1155053 B1 | 10/2004 |
| EP | 1163308 B1 | 10/2004 |
| EP | 1471105 A2 | 10/2004 |
| EP | 1001893 B1 | 11/2004 |
| EP | 1115770 B1 | 11/2004 |
| EP | 1187888 B1 | 11/2004 |
| EP | 1134126 B1 | 12/2004 |
| EP | 1591224 A1 | 2/2005 |
| EP | 1574537 A1 | 9/2005 |
| EP | 1157916 B1 | 10/2005 |
| EP | 1123348 B1 | 12/2005 |
| EP | 1602702 A1 | 12/2005 |
| EP | 1458594 B1 | 3/2006 |
| EP | 1666228 A2 | 6/2006 |
| EP | 1506265 B1 | 7/2006 |
| EP | 1578838 B1 | 8/2006 |
| EP | 1609831 B1 | 8/2006 |
| EP | 1453925 B1 | 10/2006 |
| EP | 1790554 | 5/2007 |
| GB | 903146 A | 8/1962 |
| JP | 56-004432 A | 1/1981 |
| JP | 57-117542 A | 7/1982 |

(56) References Cited

FOREIGN PATENT DOCUMENTS

| | | |
|---|---|---|
| JP | 60-096681 A | 5/1985 |
| JP | 62-062882 A | 3/1987 |
| JP | 04-059819 A | 2/1992 |
| JP | 09-176616 A | 7/1997 |
| JP | 09-249730 A | 9/1997 |
| JP | 09-031616 A | 12/1997 |
| JP | 10-045031 A | 2/1998 |
| JP | 11-106544 A | 4/1999 |
| JP | 2001-62833 A | 3/2001 |
| JP | 2001191949 A | 7/2001 |
| JP | 2001315665 | 11/2001 |
| JP | 2002154129 | 5/2002 |
| JP | 2002154129 A | 5/2002 |
| JP | 2002-362412 A | 12/2002 |
| JP | 2004315688 A | 11/2004 |
| JP | 2005187508 A | 7/2005 |
| WO | 95/25005 | 9/1995 |
| WO | 95/33785 A1 | 12/1995 |
| WO | 97/02967 A1 | 1/1997 |
| WO | 97/12929 A1 | 4/1997 |
| WO | 97/19124 A1 | 5/1997 |
| WO | 98/36944 | 8/1998 |
| WO | 98/36944 A1 | 8/1998 |
| WO | 98/52997 A1 | 11/1998 |
| WO | 98/53008 A1 | 11/1998 |
| WO | 99/02578 A1 | 1/1999 |
| WO | 00/03894 A1 | 1/2000 |
| WO | 00/12571 A1 | 3/2000 |
| WO | 00/12595 A1 | 3/2000 |
| WO | 00/13876 A1 | 3/2000 |
| WO | 00/20483 A2 | 4/2000 |
| WO | 00/27920 | 5/2000 |
| WO | 00/27920 A1 | 5/2000 |
| WO | 00/37242 A1 | 6/2000 |
| WO | 00/37554 A1 | 6/2000 |
| WO | 00/39232 A1 | 7/2000 |
| WO | 00/40629 A1 | 7/2000 |
| WO | 00/46017 | 8/2000 |
| WO | 00/52086 A2 | 9/2000 |
| WO | 01/19667 | 3/2001 |
| WO | 01/19667 A1 | 3/2001 |
| WO | 01/57130 A1 | 8/2001 |
| WO | 01/71225 A1 | 9/2001 |
| WO | 01/88033 A1 | 11/2001 |
| WO | 02/070620 A1 | 9/2002 |
| WO | 02/088214 A1 | 11/2002 |
| WO | 03/011954 A1 | 2/2003 |
| WO | 03/040251 A1 | 5/2003 |
| WO | 03/051676 A1 | 6/2003 |
| WO | 03/054069 A1 | 7/2003 |
| WO | 03/058340 A1 | 7/2003 |
| WO | 03/059997 A1 | 7/2003 |
| WO | 03/072677 A1 | 9/2003 |
| WO | 03/078163 A1 | 9/2003 |
| WO | 03/095575 A1 | 11/2003 |
| WO | 2004/050740 A1 | 6/2004 |
| WO | 2004/055092 A1 | 7/2004 |
| WO | 2004/060956 A1 | 7/2004 |
| WO | 2004/060984 A1 | 7/2004 |
| WO | 2004/062869 A2 | 7/2004 |
| WO | 2004/065485 A1 | 8/2004 |
| WO | 2004/076507 A2 | 9/2004 |
| WO | 2004/085510 A1 | 10/2004 |
| WO | 2004/085564 A1 | 10/2004 |
| WO | 2004/099312 A1 | 11/2004 |
| WO | 2005/002950 A2 | 1/2005 |
| WO | 2005/007720 A1 | 1/2005 |
| WO | 2005/044630 A1 | 5/2005 |
| WO | 2005/047393 A1 | 5/2005 |
| WO | 2005/090431 A1 | 9/2005 |
| WO | 2005/090455 A1 | 9/2005 |
| WO | 2005/095484 A1 | 10/2005 |
| WO | 2005/105405 A1 | 11/2005 |
| WO | 2005/108456 A1 | 11/2005 |
| WO | 2005/113627 A1 | 12/2005 |
| WO | 2006/074394 A2 | 7/2006 |
| WO | 2006/131190 A1 | 12/2006 |
| WO | 2007/050658 A1 | 5/2007 |
| WO | 2008/014053 A2 | 1/2008 |
| WO | 2009/124709 A1 | 10/2009 |
| WO | 2011/012997 A2 | 2/2011 |
| WO | 2011/109699 A1 | 9/2011 |

OTHER PUBLICATIONS

Opposition for European Patent No. 1790554B1; Dated Jun. 20, 2012.
Original Opposition Notice dated Mar. 7, 2012.
Opposition for European Patent No. 1790554 (translation).
Chinese Office Action dated Dec. 3, 2013; Appln. No. 201080050798,0.
PCT International Preliminary Report on Patentability dated Mar. 29, 2012; PCT/EP2010/005614.
PCT Search Report & Written Opinion dated Dec. 28, 2010; PCT/EP2010/005014.
International Search Report dated Feb. 9, 2011; for Corresponding PCT Application No. IB 2010/002051 filed Aug. 19, 2010.
Written Opinion dated—Sep. 2, 2011 for Corresponding PCT Application No. IB 2010/002051 filed Aug. 19, 2010.
International Preliminary Report on Patentability dated Jan. 31, 2012; for Corresponding PCT Application No. IB 2010/002051 filed Aug. 19, 2010.
Corresponding PCT Application No. IB 2010/002051 filed Aug. 19, 2010; Published as WO 2011/012997 A2 on Feb. 3, 2011.
*The Epoxy* Book Published by System Three Resins, Inc. Seattle, Washington.
"Epoxy Resins" Second Edition Encyclopedia of Polymer Science and Engineering, vol. 6, pp. 322-382 (1985).
Born et al, "Structural Bonding in Automotive Applications".
Dvorko. "One-Part Epoxy Compounds and Derived Foam Plastics", published Apr. 13, 2004.
Zalobsky et al., "Recommendations on Selection and Use of Cavity Reinforcement Materials" Proceedings of the 1999 Noise and Vibration Conference.
Weber et al., "Characterizing the In Vehicle Performance of Expandable Sealants Used as Acoustic Baffles", Proceedings of the 1999 Noise and Vibrations Conference.
Weber et al., "Requirements for Improved Performance of Specialty Sealing and Bonding Materials for Automotive Applications", SAE 2000 World Congress, Mar. 6-9, 2000.
Liu et al., "Validation of Epoxy Foam for Structural and Crash Application". 2004 SAE World Congress, Mar. 8-11, 2004.
Schulenburg et al., "Structural Adhesives—Improvements in Vehicle Crash Performance", 2004 SAE World Congress, Mar. 8-11, 2004.
Casey et al., "Expandable Epoxy Foam: A Systematic Approach to Improve Vehicle Performance", 2004 SAE World Congress, Mar. 8-11, 2004.
Lilley et al., Vehicle Acoustic Solutions.
Co-pending U.S. Appl. No. 10/718,509, filed Nov. 20, 2003.
Co-pending U.S. Appl. No. 60/753,973, filed Dec. 23, 2005.
Co-pending U.S. Appl. No. 60/746,810, filed May 9, 2006.
Co-pending U.S. Appl. No. 60/747,677, filed May 19, 2006.
Co-pending U.S. Appl. No. 60/804,117, filed Jun. 7, 2006.
Co-pending U.S. Appl. No. 60/820,295, filed Jul. 25, 2006.
Related U.S. Appl. No. 11/188,679, filed Jul. 25, 2005; Issued as 6,392,929 on Jul. 1, 2008.
Related U.S. Appl. No. 11/189,190, filed Jul. 26, 2005; Published as US 2006/0021697 on Feb. 2, 2006.
Related U.S. Appl. No. 11/254,129, filed Oct. 19, 2005; Published as US 2006/0090343 A1 on May 4, 2006.
Related U.S. Appl. No. 11/339,431, filed Jan. 25, 2006; Issued as 7,467,452 on Dec. 23, 2008.
Related U.S. Appl. No. 11/390,658, filed Mar. 28, 2006; Issued as 7,494,179 on Feb. 24, 2009.
Related U.S. Appl. No. 11/391,884, filed Mar. 29, 2006; Published as US 2007-0122510 A1 on May 31, 2007.
Related U.S. Appl. No. 11/339,535, filed Mar. 30, 2006; Published as US 2006-0171269 A1 on Aug. 3, 2006.

(56) References Cited

OTHER PUBLICATIONS

Related U.S. Appl. No. 11/393,431, filed Mar. 30, 2006; Published as US 2007-0134058 A1 on Jun. 14, 2007.
Related U.S. Appl. No. 11/401,207, filed Apr. 10, 2006; Published as US 2007-0087848 A1 on Apr. 19, 2007.
Related U.S. Appl. No. 11/381,769, filed May 5, 2006; Issued as 7,503,620 on Mar. 17, 2009.
Related U.S. Appl. No. 11/422,705, filed Jun. 7, 2006; Issued as 7,438,782 on Oct. 21, 2008.
Related U.S. Appl. No. 10/597,610, filed Aug. 1, 2006; Published as US 2008-0241576 A1 on Oct. 2, 2008.
Related U.S. Appl. No. 11/461,557, filed Aug. 1, 2006; Issued as 7,926,179 on Apr. 19, 2011.
Related U.S. Appl. No. 11/467,185, filed Aug. 10, 2006; Published as US 2007-0045042 A1 on Mar. 1, 2007.
Related U.S. Appl. No. 10/867,835, filed Jun. 15, 2004; Issued as 7,199,165 on Apr. 3, 2007.
Related Patent Application No. PCT/US04/20112, filed Jun. 23, 2004; Published as WO 2005/002950 on Jan. 13, 2005.
Related U.S. Appl. No. 12/936,777, filed Dec. 3, 2010; Published as US 2011-0098382 A1 on Apr. 28, 2011.
Related U.S. Appl. No. 13/040,704, filed Mar. 4, 2011; Published as US 2011/027166 on Sep. 9, 2011.
Related U.S. Appl. No. 11/551,035, filed Oct. 19, 2006; Published as US 2007-0090560 A1 on Apr. 26, 2007.
Chinese Office Action dated Sep. 19, 2014 (Appln. No. 201080050798.0).

* cited by examiner

Section cut A-A (a)          (b)          (c)

CAVITY FILLING

CLAIM OF BENEFIT OF FILING DATE

The present application claims the benefit of the filing date of PCT application Ser. No. PCT/EP2010/005614 (filed Sep. 14, 2010) (Published as WO 2011/032677) and GB 0916205.8 (filed Sep. 15, 2009), the contents of which are hereby incorporated by reference in their entirety.

The present invention relates to the provision of foamed inserts and in particular to the provision of foamed inserts in the cavities of vehicles such as automobiles, trucks, busses, railroad vehicles and aircraft. In particular the invention relates to providing foam with a high degree of expansion suitable for sealing, baffling and acoustic insulation.

It is known to provide foamed inserts in the cavities of vehicles for a variety of reasons. The foam may provide light weight reinforcement in vehicles such as in the rails or pillars of automobiles. In this instance the foam tends to be a rigid foam with a relatively low degree of expansion. Cross-linked epoxy based foams are examples of such rigid foams. Foams may also be used to provide sound insulation, vibration damping or sealing in which case a softer higher expansion foam such as one based on thermoplastic materials may be employed. The degree of expansion of the foam may range from 100% to 4000% or higher, the present invention is particularly concerned with foams having a degree of expansion of 2000% or higher.

It is also known and employed that a foamable material may be provided in a vehicle cavity in an unfoamed state and the foamable material may be such that it will foam under conditions to which the cavity containing the foamable material is subjected during processing of the cavity such as in vehicle assembly processes. One particular technique is to employ a foamable formulation that will foam under the conditions employed in the anticorrosion coating bake oven (sometimes known as e-coat oven) or a paint bake oven. It is also known that the foamable materials may be provided on a carrier which may be rigid and can provide additional reinforcement when the foam is a rigid structural material, a carrier can also be used to provide support for a more flexible foam such as that used for acoustic insulation or vibration damping.

Various means have been proposed for locating the foamable material within a cavity. For example a fastener may be provided on the foamable material or as part of a carrier for the foamable material and a hole may be provided in the wall of the cavity through which the fastener may pass to secure the foamable material in place as is described in EP 1790554-A. Other proposals include shaping the foamable material on a support for the material so that it is provided with protrusions which will lean against the interior walls of the cavity to hold the foamable material in place by friction. This however requires the foamable material to be close to the wall of the cavity and does not allow for high expansion of the foamable material in all directions. An additional proposal includes providing magnetic material within the foamable material so it may be secured to the metal wall of the cavity. This also suffers from the disadvantage that the foamable material is in contact with the wall of the cavity in certain areas and the foamable material cannot expand uniformly. Furthermore if the cavity is part of a vehicle frame or seat frame or back which is to be subjected to anticorrosion coating (e coat) after installation of the foamable material it may not be possible to coat the surface of the cavity that is in contact with the foamable material. It has also been proposed that a strip of foamable material may be stuck to one or more surfaces of the cavity by means of an adhesive. Here again it is not possible to perform an effective anticorrosion coating operation in the area where the foamable material is adhering to the metal.

Additional problems associated with these techniques are that complex molding techniques have been required to produce the foamable material of the desired size and shape for the particular cavity under consideration. Accordingly, there remains a need to provide simpler technology to produce standard or similar components that can be used to fill a variety of cavities with high expansion foam particularly high expansion foam providing acoustic insulation. Furthermore additional techniques are required to provide the means of attachment since if this is achieved by the passage of a clip through a hole in a metal wall in a cavity the need for the hole may provide a location for corrosion and rusting to occur.

In vehicle manufacture cavities are often formed by superimposing two "u" or "c" shaped components, usually metal components and securing the components together usually by the welding together of flanges provided at the sides of the "u" of "c" shaped section. Such cavities are formed at various places in the vehicle frame such as in the pillars and rails of the vehicle frame. In the vehicle assembly process the components comprising the foamable materials perhaps mounted on a carrier are provided in the desired location by attachment to one of the metal components, the cavity is completed by securing the second metal component to the first metal component containing the foamable material. The cavity is then subject to conditions that cause the foamable material to foam. Usually the foamable material is heat activated to cause foaming and is formulated so that it will foam at temperatures experienced in the vehicle assembly such as in a paint bake oven or an oven used to bake an anticorrosion coating. U.S. Pat. No. 6,003,274 suggests that partial webs may be provided in a cavity for attachment of a foamable component within a cavity.

These processes all involve multi stage and multi component assembly techniques and some involving modification of the cavity forming members. Furthermore the techniques do not lend themselves to obtaining uniform foaming particularly when producing high expansion foams in irregular shaped cavities. There remains therefore a need for a simple method for producing foams within cavities.

The present invention therefore provides a laminar structure comprising a metal foil comprising a central portion and two end portions wherein at least part of the central portion carries a foamable material.

The invention further provides a cavity defined by two cavity defining components secured together by flanges proximate to the cavity containing a laminar structure comprising a metal foil comprising a central portion and two end portions wherein at least part of the central portion carries a foamable material wherein at least one of the end portions is secured between the flanges at each side of the cavity.

The invention further provides a cavity defined by two cavity defining components secured together by flanges proximate to the cavity containing a laminar structure comprising a metal foil comprising a central portion and two end portions wherein at least part of the central portion carries a foamed material wherein at least one of the end portions is secured between the flanges at each side of the cavity.

The present invention therefore provides inserts which enable a simple and reliable technique for the provision of foamable material within a cavity and allows a more standard and simplified manufacturing process to be used. The invention is also concerned with the foaming of the material to provide a foam structure within the cavity. Cavities in vehicles such as rails and pillars or in vehicle seats, frames or backs are frequently formed by the bonding together of two suitably shaped cavity defining members which may be bonded together by welding in the case where they are of metal such as steel alternatively they may be bonded together by an adhesive such as a structural adhesive. At least one of the cavity defining members is typically U shaped or C shaped and is provided with flanges at the extremity of the shape which provide an area for bonding to another cavity defining member which may be planar or also a U or C shaped member so that the U or C shape or shapes defines the cavity and the flanges provide areas where the two cavity defining members may be bonded together.

In a further embodiment the invention provides a process for providing a foam within a cavity comprising providing a first cavity forming member provided with flanges fixing the end portions of a laminar structure of the invention to the flanges of the first cavity forming member providing a second cavity forming member provided with flanges and fixing the flanges of the second cavity forming member to the end portions of the laminar structure so that the flanges of the first and second cavity forming members secure the ends of the laminar structure and causing the foamable material to foam.

The cavity forming members may be metal stampings from metals such as steel and aluminium.

The laminar structure is designed so that ends of the foil can be secured between the flanges of the cavity forming members. The ends may be secured by any suitable means, welding and/or the use of structural adhesives being preferred. The ends may be secured sequentially to the flanges of the first and second cavity forming member or may be secured in a single bonding operation.

The foil may be of any suitable metal, such as aluminium or steel foil such as shimstock. The optimum thickness of the foil will depend upon the material from which it is made, the required length of the foil, the dimensions of the cavity and the amount of foamable material it is required to carry. However we have found that foils of a thickness in the range of 0.005 mm to 1.5 mm are particularly useful more preferably of a thickness 0.075 to 1 mm. The use of the foil secures the foamable material within the cavity and improves the handle ability of the structure for assembly in the cavity as well as aiding in the foaming operation.

The foamable material may be attached to one or both sides of the central section of the foil depending upon the shape of the cavity in which the foam is to be created. The foamable material may cover all or part of one or both surfaces of the central portion of the foil, in a preferred embodiment a layer of foamable material is provided on both sides of an aluminium foil. Conveniently the laminar structures may be obtained by moulding the foamable material onto the foil at a temperature below that at which it foams and cutting the laminate to the required size. For example the foamable material may be moulded around a moving foil. Alternatively the foamable material may be extruded onto one or both sides of a moving foil, conveniently obtained from a reel, the foamable material is then allowed to solidify and the laminate so produced cut to produce the required size and shape of laminar structure. The laminate may also be shaped by providing a suitable press in the laminate production line.

The laminar structure can be of any suitable shape according to the shape of the cavity in which it is to be used. The shape may also be tailored to provide foam in the areas of the cavity as is required. For example the structure can be stamped or otherwise impacted to be bent into any desired shape and in this way the invention provides a simple way of providing inserts suitable for the generation of foam within a cavity of irregular shape.

In a further embodiment of the invention where the cavity containing structures are provided and the application of the foil/foamable laminar material is to be accomplished on an assembly line the laminar structure may be provided with means to enable it to be handled and applied by a robot. In such a process the first cavity forming member may be delivered to a station where end portions of the laminar structure are laid over the flanges of the first cavity forming member and the end portions may be welded to the flanges. Alternatively both cavity forming members may be assembled with the end portions of the laminar structure between them and the assembly secured by a single welding operation. The second cavity forming member which may be any shape also provided with flanges, for example it may be planar or a matching image may then be applied with its flanges over the end portions of the laminar member and then secured preferably by welding to both ends of the laminar member to provide the cavity containing the laminar structure mounted in the desired position within the cavity. The cavity structure containing the laminar structure may then pass for further assembly and treatment and the foamable material may be formulated so that it foams during the subsequent treatment such as by exposure to the heat employed during the baking of anticorrosion and/or paint layers that are applied during manufacture and assembly of the article containing the foamed insert.

The foamable material will be selected according to the properties the foam is required to impart to the cavity. The invention is particularly useful when the foam is required to provide sealing and/or sound absorption in which case a high expansion, typically 100%-3000% preferably 400-2500% expansion foamable material may be used to produce a soft foam. Alternatively the foam may be required to reduce vibration and/or hardness in the vehicle and/or it may be required to provide crash resistance. If the foam is to provide a reinforcing effect it may be a rigid foam provided from a foamable material with a relatively low degree of expansion, typically 30% to 200% and it may also be a material that cross-links at a similar temperature to that at which it foams. A cross-linkable epoxy resin based formulation may be used. Preferred foamable materials are formulations that are thermoplastic at temperatures below that at which they foam and, accordingly can be extruded or injection moulded to provide the foamable material of the laminar structure at temperatures below the foaming temperature. Upon heating to cause foaming the material may be formulated so that it will cross-link if a rigid reinforcing foam is required. The foamable material preferably includes a tackifier such as a petroleum resin or a rosin ester to aid the adhesion of the foamable material to the foil and to aid the adhesion of the foam to the walls of the cavity.

The invention is particularly useful in the provision of sound insulation within automobile cavities when the foamable material is required to provide sound insulation and/or sealing the material may have a degree of expansion such as from 200% to 3000%. It may also be a soft foam without cross linking.

In the preferred production of acoustic baffles for automobiles the foamable material is such as to produce a highly expanded soft foam typically from polymers such as ethylene unsaturated ester copolymers typically ethylene vinyl acetate copolymers and/or ethylene acrylate copolymers. In this embodiment a particularly preferred material is an olefinic polymer-based acoustic foam, and more particularly an ethylene based polymer. For example, the foamable material may be based on an ethylene copolymer or terpolymer that may contain a $C_3$ to $C_8$ alpha-olefin comonomer. Examples of particularly preferred polymers include ethylene vinyl acetate copolymers, ethylene acrylate copolymers, EPDM, or mixtures thereof. Other examples of preferred foam formulations that are commercially available include polymer-based materials commercially available from L & L Products, Europe, under the designations as L-2704, L-2806, L-2811, L-2820, L-2821, L-1066, L-2105, L-2106, L-2115, L-2308, L-2411, L-2412, L-2663, L-2664, L-2700, L-2703, L-4161, L-4200, L-4300, L-4315, L-4316, L7102, L7107 and L7220. These materials may readily be laminated to a foil such as aluminium, steel or plastic foil by extrusion to form the laminar structure employed in this invention.

A number of other suitable materials are known in the art and may also be used for producing foams for noise attenuation and/or vibration damping. One such foam includes an open-cell polymeric base material, such as an ethylene-based polymer which, when compounded with appropriate ingredients (typically a blowing and curing agent), expands and cures in a reliable and predictable manner upon the application of heat or the occurrence of a particular ambient condition. From a chemical standpoint for a thermally activated material, an acoustic foam is usually initially processed as a flowable thermoplastic material before curing. It will preferably cross-link upon curing, which makes the material resistant to further flow or change of final shape.

While the preferred materials for fabricating a sound absorption and/or vibration damping material have been disclosed, the material can be formed of other materials (e.g., foams regarded in the art as structural foams) provided that the material selected is heat-activated or otherwise activated by an ambient condition (e.g. moisture, pressure, time or the like) and cures in a predictable and reliable manner under appropriate conditions for the selected application.

Some other possible materials include, but are not limited to, polyolefin materials, copolymers and terpolymers, phenol/formaldehyde materials, phenoxy materials, and polyurethanes. U.S. Pat. Nos. 5,266,133; 5,766,719; 5,755,486; 5,575,526; 5,932,680; and WO 00/27920 describe suitable materials. In general, the desired characteristics of the resulting foam include relatively low glass transition point, and good corrosion resistance properties. In this manner, the material does not generally interfere with the materials systems employed by automobile manufacturers. Moreover, it will withstand the processing conditions typically encountered in the manufacture of a vehicle, such as the e-coat priming, cleaning and degreasing and other coating processes.

Generally, suitable expandable foams have a range of expansion ranging from approximately 100 to over 1000 percent. The level of expansion of the acoustical foam may be to as high as 1500 to 2000 percent or more.

In another embodiment, the sound absorption material may be provided in an encapsulated or partially encapsulated form, for instance an expandable foamable material is encapsulated or partially encapsulated in an adhesive shell. Moreover, the sound absorption material may include a melt-flowable material such as that disclosed in U.S. Pat. No. 6,030, 701.

One or more curing agents may be included in the foamable material used in this invention. Optionally curing agent accelerators may also be included. The amounts of curing agents and curing agent accelerators used can vary widely depending upon the type of structure desired, the desired properties of the foamed material and the desired amount of expansion of the foamable material and the desired rate of expansion. Exemplary ranges for the curing agents or curing agent accelerators present in the foamable material range from about 0.001% by weight to about 7% by weight.

Preferably, the curing agents assist the foamable material in curing by cross linking of the polymers, phenoxy epoxy resins or both and any epoxy resin that may be present. It is also preferable for the curing agents to assist in thermosetting the foamed material. Useful classes of curing agents are materials selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolak resins, copolymers such as those of phenol terpene, polyvinyl phenol, or bisphenol-A formaldehyde copolymers, bishydroxyphenyl alkanes or the like), or mixtures thereof. Particular preferred curing agents include modified and unmodified polyamines or polyamides such as triethylenetetramine, diethylenetriamine tetraethylenepentamine, cyanoguanidine, dicyandiamides and the like. If an accelerator for the curing agent is used examples of materials includes a modified or unmodified urea such as methylene diphenyl bis urea, an imidazole or a combination thereof.

Depending upon the function required of the foamed material, it may include one or more additional polymers or copolymers, which can include a variety of different polymers, such as thermoplastics, elastomers, plastomers and combinations thereof. For example, and without limitation, polymers that might be appropriately incorporated into the foamable material include halogenated polymers, polycarbonates, polyketones, polyurethanes, polyesters, and polymers derived from silanes, sulfones, allyls, olefins, styrenes, acrylates, methacrylates, epoxies, silicones, phenolics, rubbers, polyphenylene oxides, terphthalates, acetates (e.g., EVA), acrylates, methacrylates (e.g., ethylene methyl acrylate polymer) or mixtures thereof. Other potential polymeric materials may be or may include, without limitation, polyolefin (e.g., polyethylene, polypropylene)polystyrene, polyacrylate, poly(ethylene oxide), poly(ethyleneimine), polyester, polyurethane, polysiloxane, polyether, polyphosphazine, polyamide, polyimide, polyisobutylene, polyacrylonitrile, poly(vinyl chloride), poly(methyl methacrylate), poly(vinyl acetate), poly(vinylidene chloride), polytetrafluoroethylene, polyisoprene, polyacrylamide, polyacrylic acid, polymethacrylate.

When used, these polymers can comprise a small portion or a more substantial portion of the material. When used, the one or more additional polymers preferably comprises about 0.1% to about 50%, more preferably about 1% to about 20% and even more preferably about 2% to about 10% by weight of the foamable material.

Examples of suitable rigid materials include foamable epoxy-base resins and examples of such materials are the products L0507, L5207, L5214, L5234, L5235, L5236, L5244, L-8050 and L-8150, which are commercially available from L & L Europe, Strasbourg, France. The product should be chosen so that it can be shaped at temperatures below that at which it will foam, typically 80° C. to 90° C. and according to the rate of expansion and foam densities required. It is further preferred that where it is used in automobile frame or seat manufacture it expands at the temperatures experienced in the oven used to dry and cure the anti-corrosion coating deposited in the e-coat process, typically 120° C. to 180° C., more typically 130° C. to 150° C. Prior to activation, the foamable material is preferably dry and not tacky to the touch, since this facilitates shipping and handling and prevents contamination.

Epoxy resin is used herein to mean any of the conventional dimeric, oligomeric or polymeric epoxy materials containing at least one epoxy functional group. The epoxy content is typically more than 40%. Moreover, the term epoxy resin can be used to denote one epoxy resin or a combination of multiple epoxy resins. The polymer-based materials may be epoxy-containing materials having one or more oxirane rings polymerizable by a ring opening reaction. In a preferred embodiment, the foamable material includes between about 2% and 75% by weight epoxy resin, more preferably between about 4% and 60% by weight epoxy resin and even more preferably between about 25% and 50% by weight epoxy resin. Of course, amounts of epoxy resin may be greater or lower depending upon the intended application of the activatable material.

The epoxy may be aliphatic, cycloaliphatic, aromatic or the like. The epoxy may be supplied as a solid (e.g., as pellets, chunks, pieces or the like) or a liquid (e.g., an epoxy resin) although liquid resins are preferred to enhance process ability of the adhesive formulation. As used herein, unless otherwise stated, a resin is a solid resin if it is solid at a temperature of 23° C. and is a liquid resin if it is a liquid at 23° C. The epoxy may include an ethylene copolymer or terpolymer.

An epoxy resin may be added to the foamable material to increase the adhesion, flow properties or both of the material. One exemplary epoxy resin may be a phenolic resin, which may be a novolac type or other type resin. Other preferred epoxy containing materials may include a bisphenol-A epichlorohydrin ether polymer, or a bisphenol-A epoxy resin which may be modified with butadiene or another polymeric additive or bisphenol-F-type epoxy resins. Moreover, various mixtures of several different epoxy resins may be employed as well. Examples of suitable epoxy resins are sold under the tradename Araldite GY 282, GY 281 and GY 285 supplied by Huntsman.

In certain embodiments, it may be desirable to include one or more thermoplastic polyethers and/or thermoplastic epoxy resins in the foamable material. When included, the one or more thermoplastic polyethers preferably comprise between about 1% and about 90% by weight of the foamable material, more preferably between about 3% and about 60% by weight of the foamable material and even more preferably between about 4% and about 25% by weight of the foamable material. As with the other materials, however, more or less thermoplastic polyether may be employed depending upon the intended use of the foamable material.

The thermoplastic polyethers typically include pendant hydroxyl moieties. The thermoplastic polyethers may also include aromatic ether/amine repeating units in their backbones. The thermoplastic polyethers of the present invention preferably have a melt index between about 5 and about 100, more preferably between about 25 and about 75 and even more preferably between about 40 and about 60 grams per 10 minutes for samples weighing 2.16 Kg at a temperature of about 190° C. Of course, the thermoplastic polyethers may have higher or lower melt indices depending upon their intended application. Preferred thermoplastic polyethers include, without limitation, polyetheramines, poly(amino ethers), copolymers of monoethanolamine and diglycidyl ether, combinations thereof or the like. Preferably, the thermoplastic polyethers are formed by reacting an amine with an average functionality of 2 or less (e.g., a difunctional amine) with a glycidyl ether (e.g., a diglycidyl ether). As used herein, the term difunctional amine refers to an amine with an average of two reactive groups (e.g., reactive hydrogens).

According to one embodiment, the thermoplastic polyether is formed by reacting a primary amine, a bis(secondary) diamine, a cyclic diamine, a combination thereof or the like (e.g., monoethanolamine) with a diglycidyl ether or by reacting an amine with an epoxy-functionalized poly(alkylene oxide) to form a poly(amino ether). According to another embodiment, the thermoplastic polyether is prepared by reacting a difunctional amine with a diglycidyl ether or diepoxy-functionalized poly (alkylene oxide) under conditions sufficient to cause the amine moieties to react with the epoxy moieties to form a polymer backbone having amine linkages, ether linkages and pendant hydroxyl moieties. Optionally, the polymer may be treated with a monofunctional nucleophile which may or may not be a primary or secondary amine.

Additionally, it is contemplated that amines (e.g., cyclic amines) with one reactive group (e.g., one reactive hydrogen) may be employed for forming the thermoplastic polyether. Advantageously, such amines may assist in controlling the molecular weight of the thermoplastic ether formed.

Examples of preferred thermoplastic polyethers and their methods of formation are disclosed in U.S. Pat. Nos. 5,275,853; 5,464,924 and 5,962,093. Advantageously, the thermoplastic polyethers can provide the foamable material with various desirable characteristics such as desirable physical and chemical properties for a wide variety of applications as is further described herein.

Although not required, the formulation may include one or more ethylene polymers or copolymers such as ethylene acrylate, copolymers and ethylene acetate copolymers. Ethylene methacrylate and ethylene vinyl acetate are two preferred ethylene copolymers.

It may also be desirable to include a reactive polyethylene resin that is modified with one or more reactive groups such as glycidyl methacrylate or maleic anhydride. Examples of such polyethylene resins are sold under the tradename LOTADER® (e.g., LOTADER AX 8900) and are commercially available from Arkema Group.

One or more blowing agents may used to cause the material to be foamable by producing inert gasses that form, as desired, an open and/or closed cellular structure of the foamed material.

The blowing agent may include one or more nitrogen containing groups such as amides, amines and the like. Examples of suitable blowing agents include azodicarbonamide, dinitrosopentamethylenetetramine, azodicarbonamide, initrosopentamethylenetetramine, 4,4,-oxy-bis-(benzenesulphonyl-hydrazide), trihydrazinotriazine and N,N,-dimethyl-N,N,-dinitrosoterephthalamide. An accelerator for the blowing agents may also be provided. Various accelerators may be used to increase the rate at which the blowing agents form inert gasses. One preferred blowing agent accelerator is a metal salt, such as an oxide, for example zinc oxide. Other preferred accelerators include modified and unmodified thiazoles or imidazoles. The amounts of blowing agents and blowing agent accelerators that should be used can vary widely depending upon the type of cellular structure desired, the desired amount of expansion the desired rate of expansion and the like. Exemplary ranges for the amounts of blowing agents and blowing agent accelerators in the activatable material range from about 0.001% by weight to about 5% by weight.

The foamable material may also include one or more fillers, including but not limited to particulate materials (e.g., powder), beads, microspheres such as Zeospheres available from Zeelan Industries, or the like. Preferably the filler includes a material that is generally non-reactive with the other components present in the activatable material. While the fillers may generally be present to take up space at a relatively low weight, it is contemplated that the fillers may also impart properties such as strength and impact resistance.

Examples of fillers that may be used include silica, diatomaceous earth, glass, clay (e.g., including nanoclay), talc, pigments, colorants, glass beads or bubbles, glass, carbon or ceramic fibers, nylon or polyamide fibers (e.g., Kevlar), antioxidants, and the like. Such fillers, particularly clays, can assist in leveling itself during flow of the foamable material. The clays that may be used as fillers may include clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

In one preferred embodiment, one or more mineral or stone type fillers such as calcium carbonate, sodium carbonate or the like may be used as fillers. In another preferred embodiment, silicate minerals such as mica may be used as fillers.

When employed, the fillers can range from 10% or less to 90% or greater by weight of the foamable material, but more typical from about 20 to 55% by weight of the foamable material. According to some embodiments, the foamable material may include from about 0% to about 3% by weight, and more preferably slightly less that 1% by weight clays or similar fillers. Powdered (e.g. about 0.01 to about 50, and more preferably about 1 to 25 micron mean particle diameter) mineral type filler can comprise between about 5% and 70% by weight, more preferably about 10% to about 50% by weight.

Other additives, agents or performance modifiers may be included in the foamable material as desired, including but not limited to an antioxidant, a UV resistant agent, a flame retardant, an impact modifier, a heat stabilizer, a colorant, a processing aid, a lubricant, a reinforcement (e.g., chopped or continuous glass, ceramic, aramid, or carbon fiber, particulates or the like). Liquid polysufides may be used to improve the environmental exposure such as exposure to humidity and salt water.

In a preferred embodiment the foamable material contains an adhesion promoting material such as a petroleum resin or a synthetic or naturally occurring rosin ester tackifier. The use of these materials can improve the adhesion of the foamable material to the foil and can also improve the adhesion of the foamed material to the walls of the cavity. It is preferred to include from 0.5 to 10 wt % of such an adhesion promoting material When determining appropriate components for the foamable material, it may be important to formulate the material so that it will foam at appropriate times or temperatures. For instance, in some applications, it is undesirable for the material to be reactive at room temperature or otherwise at the ambient temperature in a production environment. More typically, the material flows and foams at higher processing temperatures. As an example, temperatures such as those encountered in an automobile assembly plant may be appropriate, especially when the foamable material is processed along with the other components at elevated temperatures or at higher applied energy levels, e.g., during painting preparation steps. In addition it is preferable that the foamable material be non-tacky to the touch at ambient temperature to reduce the pick up of dirt and dust and to facilitate storage and transportation.

The amount of foamable material employed on the foil will be determined by the size of the cavity in which the foam is to be provided and the desired degree of expansion. However for most vehicles a laminar structure containing a layer of foamable material from 1.5 mm to 10 mm thick has been found to be appropriate particularly for the production of a sound absorption and/or vibration damping foam.

In a further embodiment the present invention may be used for the structural reinforcement of cavities in body frames and in seats of automobiles or other transportation systems such as trucks, buses, railroad vehicles and aircraft. Here the foamable material is generally a rigid reinforcing thermosetting layer such as a foamable epoxy resin or a foamable polyurethane which may be a blocked polyurethane. In this instance the foamable material serves two main functions, it will expand across the space between the foil and the interior of the hollow section and will bond to some or all of the interior walls of the hollow section. Activation therefore enables the foamable material to expand and fill a gap between the foil and a hollow structure it is designed to reinforce and to bond to selected internal surfaces of the hollow structure. Accordingly the foamable material must expand at the desired temperature and be sufficiently adhesive to firmly bond the reinforcing member inside the vehicle structure. In this embodiment once foamed it should be sufficiently strong that it does not contribute any weakness to the overall reinforcing effect provided.

The invention is illustrated but in way limited by reference to the accompanying drawings in which FIG. 1 is a top view of a laminar structure of the present invention.

The same reference numbers are used to indicate like features in the remaining figures. FIG. 2 being the section taken along A-A of FIG. 1 showing the foil (4) and FIG. 3 shows a laminar structure similar to that shown in FIG. 1 shaped to conform to the cavity in which it is to be used.

Figure 1:
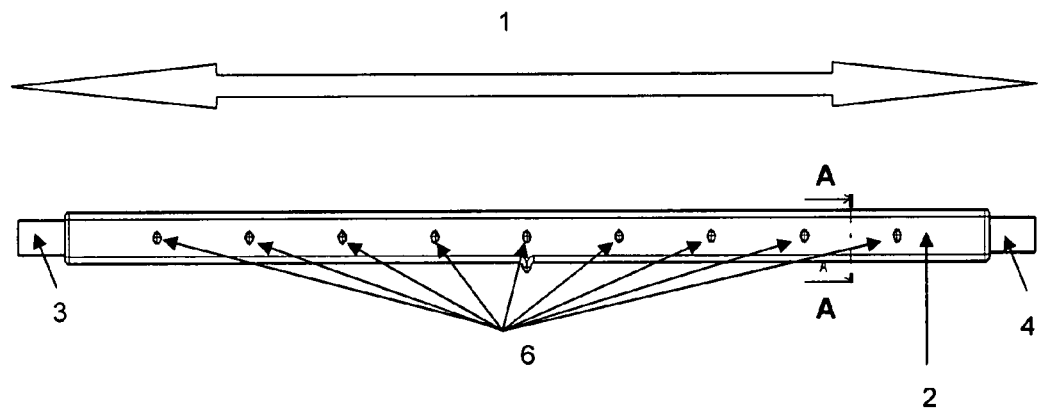
FIG. 1 shows the elongated laminar member (1) having a central portion (2) and two end portions (3) and (4). The central portion (2) is covered by a foamable material (5) and is also provided with deformations points (6) to enable modification of the shape of the member.
Figure 2:
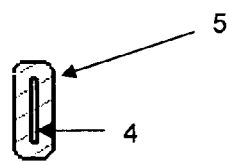
FIG. 2 is a cross sectional view taken through the line A-A of the laminar structure of FIG. 1.
Figure 3:
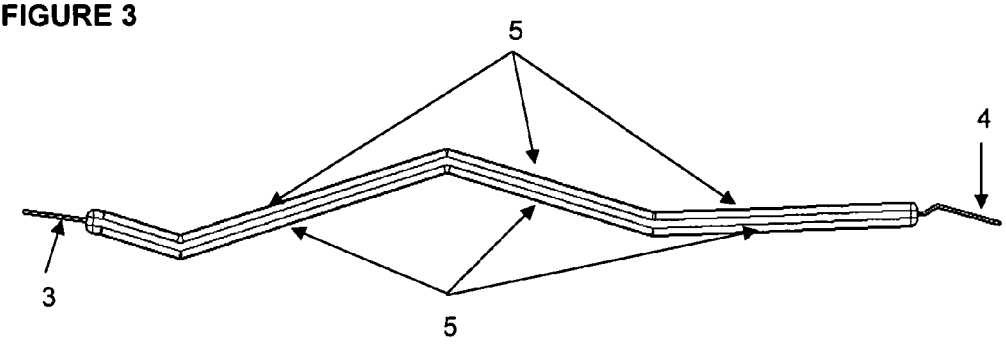
FIG. 3 is a side view of a laminar structure of the present invention.
Figure 4:
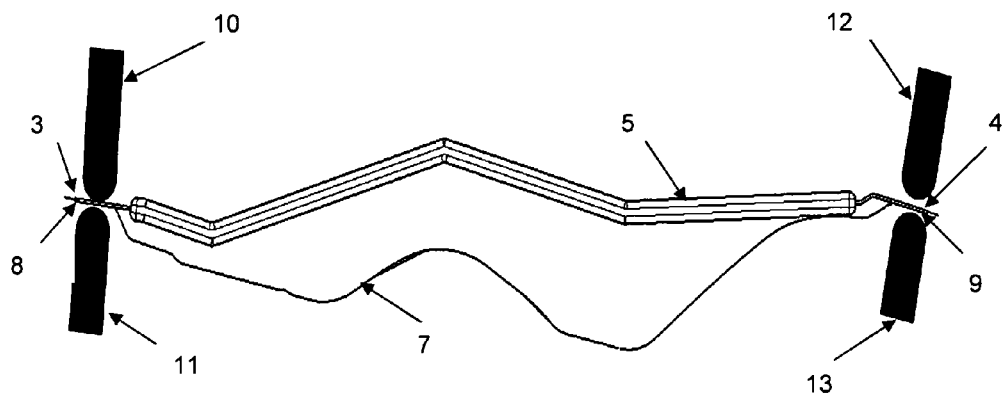
FIG. 4 shows the laminar structure of FIG. 3 in position with one of the cavity forming members.
Figure 5:
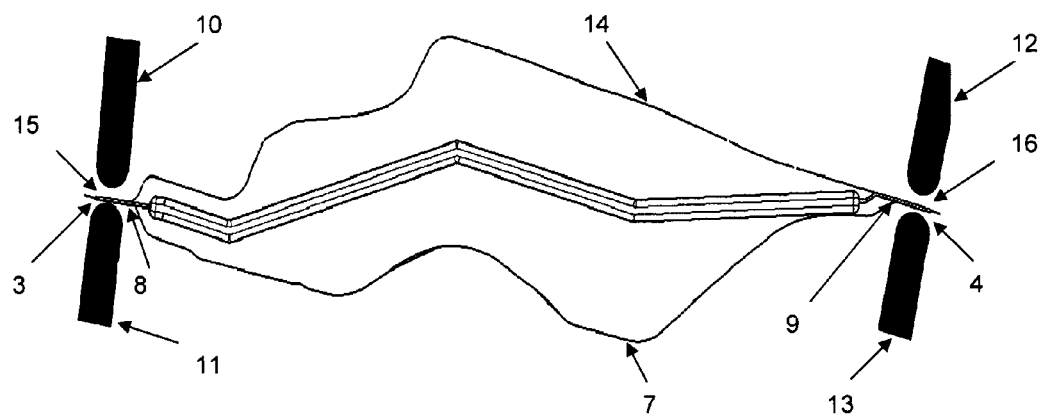
FIG. 5 shows the structure of FIG. 4 provided with the second cavity forming member.
Figure 6:
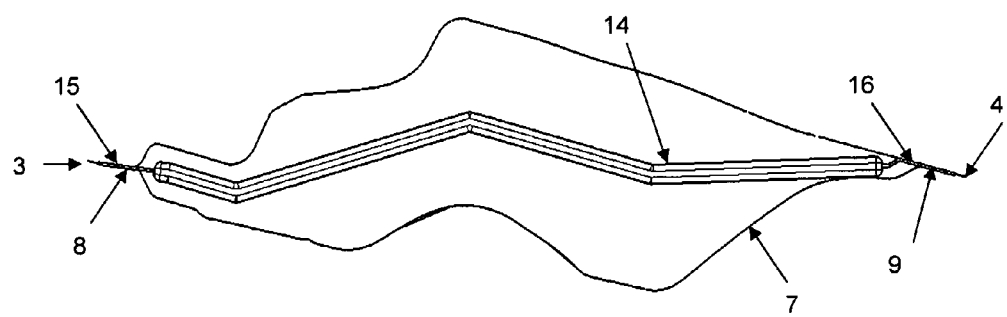
FIG. 6 shows the structure of FIG. 5 with the cavity forming members and the laminar structure secured to each other.

FIG. 4 shows the structure of FIG. 3 assembled with a first cavity defining member (7) having flanges (8) and (9) at each end. Pairs of welding heads (10) and (11) and (12) and (13) are shown for securing the ends of the laminar structure to the flanges of the first cavity defining member. FIG. 5 shows the assembly of FIG. 4 together with the second cavity forming member (14) with its flanges (15) and (16) for welding to the other side of the end portions of the laminar structure. FIG. 6 shows the cavity structure containing the laminar structure with the welding completed.

Figure 7:
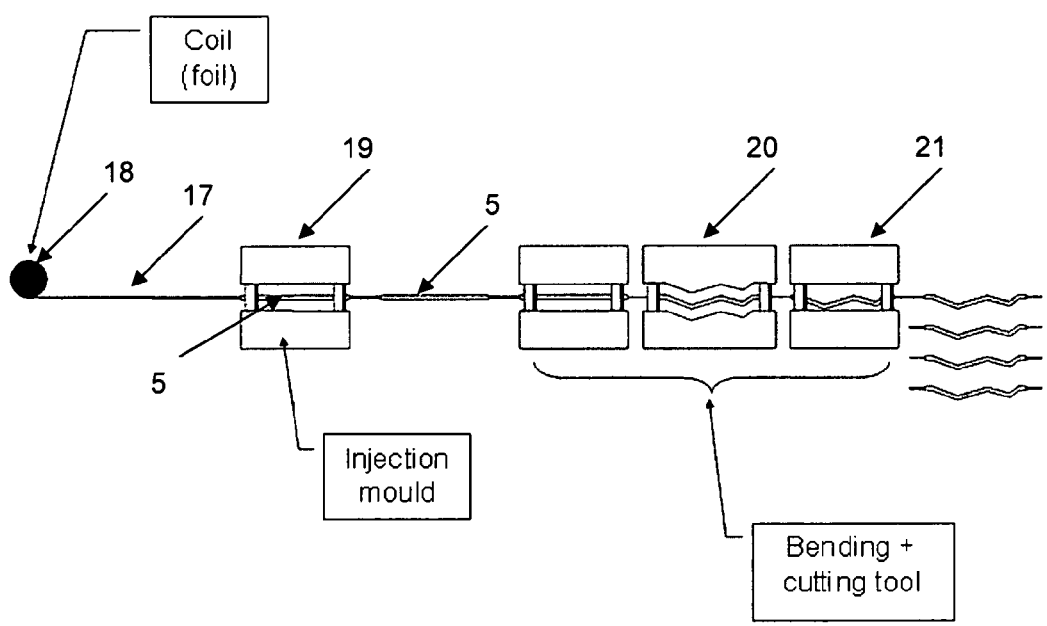
FIG. 7 illustrates a process for the production of laminar structures such as those illustrated in FIG. 2.

FIG. 7 is a schematic illustration of a continuous process for providing laminar structures such as those illustrated in FIG. 3. FIG. 7 shows a metal foil (17) being removed from a reel of foil (18) and passing through a mould (19) where foamable material (5) is sequentially moulded around central sections of elements of the foil. The foil coated with the foamable material then passes to a press (20) where it is shaped into the desired configuration. The shaped structure then passes to a cutting device (21) where the individual laminar structures are produced from the moving coated foil.

Figure 8:
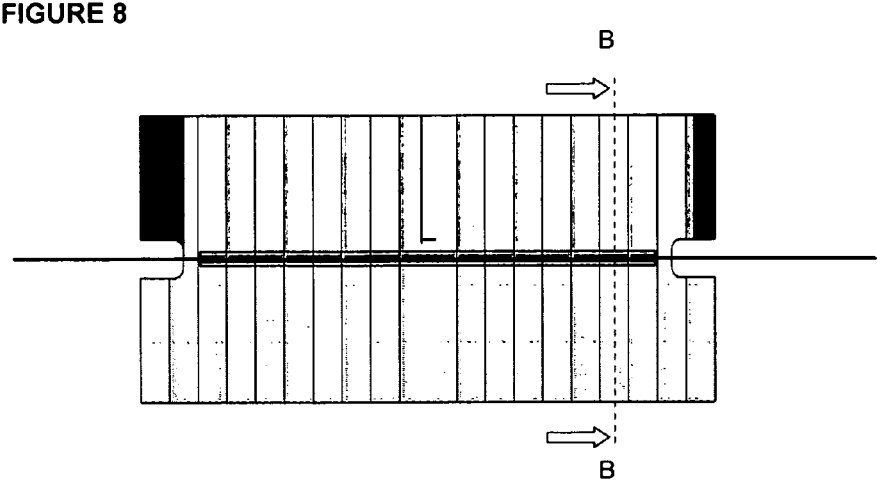
FIG. 8 illustrates the operation of the moulding section of the process illustrated in FIG. 7.
Figure 8:
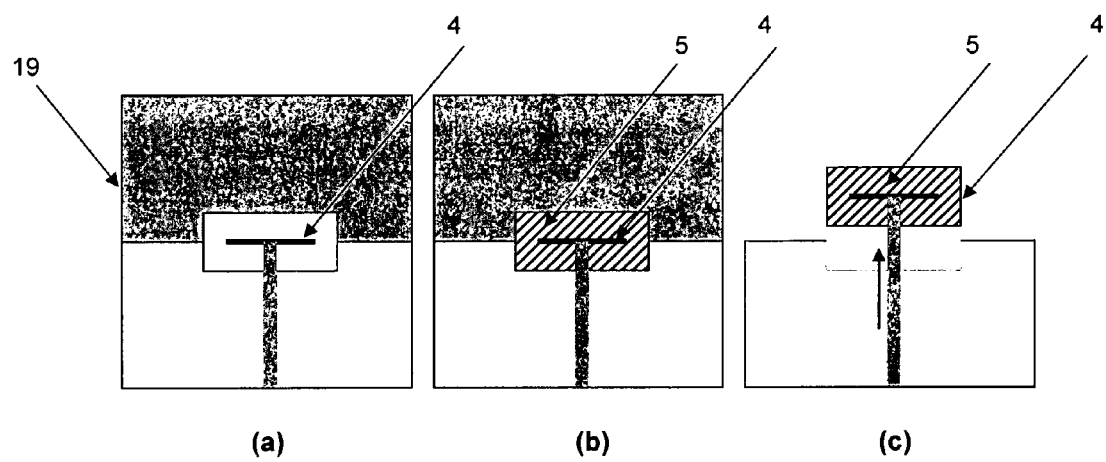

FIG. 8 shows how the foamable material may be applied to the foil in the mould (19) of FIG. 7. FIG. 8*a* being a cross sectional view taken on the line B-B showing the foil passing into the mould, FIG. 8*b* shows the foamable material moulded around the foil and FIG. 8*c* shows how laminar structure can be removed from the mould.

The invention claimed is:

1. A cavity comprising:
   two cavity defining components secured together by flanges proximate to the cavity;
   a laminar structure located within the cavity defining components and comprising a metal foil having a central portion and two end portions;
   wherein at least part of the central portion carries a foamable material; and
   wherein at least one of the end portions is secured between the flanges at each side of the cavity.

2. A cavity according to claim 1, wherein the cavity is formed within a vehicle.

3. A cavity according to claim 2, wherein the cavity is found in rails, pillars or seat frames.

4. A cavity according to claim 1, wherein the cavity forming members are metal stampings.

5. A cavity according to claim 1, wherein the central portion carries a foamed or foamable material on both sides of the metal foil.

6. A cavity according to claim 1, wherein both end portions are secured between the flanges at each side of the cavity.

7. A cavity according to claim 1, wherein the foil is steel foil.

8. A cavity according to claim 1, wherein the foamed or foamable material is attached to one or both sides of the central section of the foil.

9. A cavity according to claim 1, wherein the foam provides sealing and/or sound absorption.

10. A cavity according to claim 1, wherein the foam provides light weight reinforcement.

11. A cavity according to claim 1, wherein the has a degree of expansion of from about 100% to about 3000%.

12. A cavity according to claim 1, wherein the ends of the foil are secured between the flanges of the cavity forming members by welding and/or the use of structural adhesives.

13. A cavity according to claim 1, wherein the ends are secured sequentially to the flanges of the first and second cavity forming member.

14. A cavity according to claim 1, wherein the ends are secured in a single bonding operation to the flanges of the first and second cavity forming member.

15. A cavity according to claim 1, wherein the laminar structures are produced in a joined and continuous manner comprising moulding a foamable material onto a foil at a temperature below that at which it foams and cutting the laminate to the required size and repeating the process.

16. A cavity according to claim 1, wherein the foamable material is moulded or extruded around a moving foil.

17. A cavity according to claim 1, wherein the laminate is pressed to the required shape prior to cutting.

18. A cavity according to claim 1, wherein the foil has a thickness of 0.075 mm to 1 mm.

19. A cavity according to claim 1, wherein the laminar structure includes a layer of foamable material from 1.5 mm to 10 mm thick.

20. A cavity according to claim 1, wherein the central portion includes deformations points to enable modification of the shape of the member.

* * * * *